(12) United States Patent
Dacre-Wright et al.

(10) Patent No.: US 10,854,094 B2
(45) Date of Patent: Dec. 1, 2020

(54) REJOINING TRAJECTORY ADJUSTMENT METHOD FOR AIRCRAFT

(71) Applicant: THALES, Courbevoie (FR)

(72) Inventors: Benoit Dacre-Wright, Toulouse (FR); Didier Poisson, Toulouse (FR); Guy Deker, Toulouse (FR); Vincent Savarit, Toulouse (FR)

(73) Assignee: THALES, Courbevoie (FR)

( * ) Notice: Subject to any disclaimer, the term of this patent is extended or adjusted under 35 U.S.C. 154(b) by 315 days.

(21) Appl. No.: 15/919,630

(22) Filed: Mar. 13, 2018

(65) Prior Publication Data
US 2018/0276999 A1 Sep. 27, 2018

(30) Foreign Application Priority Data

Mar. 21, 2017 (FR) ...................................... 17 00291

(51) Int. Cl.
| | | |
|---|---|---|
| G08G 5/00 | (2006.01) | |
| G05D 1/02 | (2020.01) | |
| G05D 1/08 | (2006.01) | |
| G05D 1/04 | (2006.01) | |
| G05D 1/06 | (2006.01) | |
| G01C 21/00 | (2006.01) | |
| G05D 1/00 | (2006.01) | |

(52) U.S. Cl.
CPC ........... *G08G 5/0039* (2013.01); *G01C 21/00* (2013.01); *G05D 1/0005* (2013.01); *G05D 1/0202* (2013.01); *G05D 1/042* (2013.01); *G05D 1/0607* (2013.01); *G05D 1/0808* (2013.01); *G08G 5/0021* (2013.01); *G08G 5/0052* (2013.01)

(58) Field of Classification Search
CPC .... G08G 5/0039; G05D 1/0202; G05D 1/042; G05D 1/0607; G05D 1/0808
See application file for complete search history.

(56) References Cited

U.S. PATENT DOCUMENTS 9,495,878 B2 * 11/2016 Kozlow ............... G08G 5/0039

FOREIGN PATENT DOCUMENTS

| EP | 2 178 065 A1 | 4/2010 |
|---|---|---|
| FR | 2 854 948 A1 | 11/2004 |
| FR | 2 945 622 A1 | 11/2010 |
| FR | 2 949 577 A1 | 3/2011 |

(Continued)

OTHER PUBLICATIONS

Santiago, "A Trajectory Management Strategy for Nonconforming Flights and Multi-Agent Separation Assurance", 2013 Aviation Technology, Integration, and Operations Conference, Aug. 2013, pp. 1-12. (Year: 2013).*

*Primary Examiner* — Todd Melton
(74) *Attorney, Agent, or Firm* — BakerHostetler

(57) ABSTRACT

A method is provided for adjusting a flight plan rejoining trajectory of an aircraft, the method being implemented in a flight management system of the aircraft. In a first step, the rejoining trajectory comprises a guidance setpoint holding point to be reached situated in the extension of a guidance setpoint, and set manually or automatically, the guidance setpoint no longer being necessarily maintained when this setpoint holding point is passed. This first step can be preceded by a step of rejoining a guidance setpoint or a step of searching for the intersection of the current guidance setpoint trajectory with a segment of the flight plan.

15 Claims, 5 Drawing Sheets

(56) References Cited

FOREIGN PATENT DOCUMENTS

| | | |
|---|---|---|
| FR | 3 027 722 A1 | 4/2016 |
| FR | 3 031 175 A1 | 7/2016 |
| WO | 01/95289 A1 | 12/2001 |

\* cited by examiner

REJOINING TRAJECTORY ADJUSTMENT METHOD FOR AIRCRAFT

CROSS-REFERENCE TO RELATED APPLICATIONS

This application claims priority to foreign French patent application No. FR 1700291, filed on Mar. 21, 2017, the disclosure of which is incorporated by reference in its entirety.

FIELD OF THE INVENTION

The field of the invention is that of aircraft navigation and guidance. More specifically, the field of the invention is that of the determination of a so-called rejoining trajectory when the pilot has had to divert from his or her initial flight plan. A flight plan should be understood to be the lateral and vertical reference corresponding to the planned flight of the aircraft.

BACKGROUND

Currently, when the pilot has to temporarily divert from his or her flight plan, either at the request of air traffic control, or to deal with an unforeseen situation like a weather disturbance, for example, he or she interrupts the navigation along the flight plan by selecting a guidance setpoint called selected setpoint. In this case, the prediction hypotheses along the flight plan no longer faithfully and reliably reflect the future progress of the flight. In particular, for a heading setpoint, the trajectory length which will be flown to the destination or to a future point where the aeroplane will have rejoined the flight plan, is unknown. It is no more than simplistically estimated by these hypotheses. Now, the pilot continues to need accurate predictions concerning the continuation of the flight. In particular, he or she needs to know if the current quantity of fuel is still sufficient to the end of the flight or to know how his or her time of arrival has changed. Moreover, when the aeroplane is descending, the pilot has to be careful to anticipate its descent profile to keep to the next altitude or speed constraints imposed by the procedures, be capable of stabilizing at a minimum height before the runway threshold, and possibly take care to keep to a constraint of time of arrival at a given point of his or her flight plan, imposed by air traffic control to ensure the sequencing of the aircrafts in approach at one and the same airport. All these predictions have to be able to rely on a lateral and vertical trajectory hypothesis that is as close as possible to the current operational hypotheses. When air traffic control, or particular circumstances, demand a lateral deviation by a heading setpoint, or a level at constant altitude, or a particular speed setpoint, the hypotheses for return to the flight plan not being known, the system is generally unable to provide the pilot with operationally relevant indications.

If the pilot has to then resume his or her navigation along the flight plan, the trajectory hypothesis has to make it possible to switch from the current guidance setpoint to a point of return to the flight plan, even though the current guidance is not yet convergent. Failing such a trajectory, the manoeuvre for return to the flight plan often remains the responsibility of the pilot, requiring sustained attention on his or her part until the conditions of return to the automatic guidance along the flight plan are once again met. This workload is often untimely in busy flight phases when the pilot has to devote himself or herself to numerous other communication or monitoring tasks.

The problem is therefore how to provide the pilot with a trajectory hypothesis that conforms to the expectation of the pilot and to the operational context, in such a way as to facilitate the management of the flight and the return to the guidance along the flight plan or at the latest the final alignment and the stabilization before landing.

Currently, the predictions along the flight plan are always computed according to a simplified and generally unflyable hypothesis of immediate return to the flight plan, from the current position of the aircraft, and sometimes to an active segment which is no longer operationally relevant.

SUMMARY OF THE INVENTION

To resolve this problem, in the case of a lateral deviation, various methods have been proposed. Thus, the application FR 3 031 175 entitled "Procédé de rejointe automatique d'une route d'un aéronef" (Method for automatically rejoining a route of an aircraft) describe an ongoing flight plan rejoining trajectory computation method.

Various rejoining strategies can be envisaged, prioritizing or not the intersection of the flight plan by the current heading setpoint of the aeroplane. When no intersection exists between the current heading setpoint and the flight plan, the rejoining trajectory captures one of the legs of the flight plan, from the current position and heading of the aeroplane, according to a determined angle. The determined angle can be, for example, equal to 45° or to 90° depending on the situation of the aircraft. A "leg" should be understood to be a unitary portion of the flight plan meeting a final condition according to a manoeuvre specified by the type of the leg. The possible different leg types are defined by the ARINC 424 standard. This proposal of a rejoining trajectory is a necessary prerequisite for maintaining a satisfactory and coherent rejoining trajectory hypothesis and thus making it possible to inform the pilot on the most reliable time and fuel predictions to the destination, on following his or her descent profile, keeping to the next constraints or the stabilization before landing.

Similarly, in the case of a vertical deviation relative to the flight plan, the flight management systems according to the prior art generally make it possible to predict the return to the vertical profile of the flight plan.

These rejoining strategies have a common point: the flight plan rejoining trajectory is always computed according to a hypothesis of return to the flight plan as early as possible, from the current position of the aircraft. When the rejoining is proposed by a capture of the flight plan by the current guidance setpoint, it is because this setpoint constitutes the best rejoining hypothesis from the current position.

The trajectory proposal deriving from these various methods may not be operationally suitable, either because it rejoins the flight plan earlier than the pilot envisages, or because it remains in conflict with a weather disturbance, a relief, or the surrounding traffic, or even that it is incompatible with keeping to a constraint or the stabilization of the aircraft before landing.

Consequently, the current operational context necessitates rejoining the flight plan differently, for example at a greater distance by disregarding the closest flight plan portions, or to still maintain the guidance setpoint over a certain distance or for a certain time, or to a certain altitude. The rejoining is then effective only once this phase is accomplished. The current methods do not allow the pilot to accurately adjust the rejoining trajectory to correspond to such a hypothesis.

As laterally, when the observance of a given constraint necessitates maintaining the current setpoint heading for a certain time before rejoining the flight plan, this maintaining of heading is not proposed to the pilot. He or she does not therefore have an operationally satisfactory set of predictions. He or she must maintain the heading and wait for the desired conditions to be fulfilled to be able to then identify and adjust the rejoining of the flight plan. For example, in approach phase, a pilot follows a setpoint heading contrary to the final approach axis. He or she therefore moves away from the runway, before making a half-turn to land. He or she is still too close to the runway and too high or too fast, for an immediate half-turn to allow him or her to land. An immediate rejoining of his or her approach axis does not therefore provide him or her with a satisfactory hypothesis for managing his or her approach. And there is nothing to tell him or her clearly how long he or she must maintain his or her current heading to be in satisfactory conditions for stabilizing before landing. He or she must wait for the immediate rejoining trajectory to become satisfactory.

The pilot remains responsible for the safety of the flight and may need to laterally adjust the proposed return trajectory. However, the selection of lateral guidance setpoints at the present time offers only one degree of freedom, the heading, for adjusting laterally. This degree of freedom can prove ineffective for obtaining tactical trajectory operationally desired by the pilot.

The trajectory rejoining method according to the invention does not present these drawbacks. Indeed, this method, unlike the methods according to the prior art, does not seek to determine the shortest rejoining trajectory but takes account of other flight constraints by determining, among other things, a guidance setpoint holding point to be reached. More specifically, the subject of the invention is a method for adjusting a flight plan rejoining trajectory of an aircraft, said method being implemented in a flight management system of said aircraft, characterized in that, in a first step, the rejoining trajectory comprises a guidance setpoint holding point to be reached situated in the extension of a guidance setpoint, the guidance setpoint no longer being necessarily maintained when this setpoint holding point is passed.

Advantageously, a guidance setpoint holding point corresponds to a geographic point along the guidance setpoint, said geographic point being defined either by a distance, or by a time duration, or by an altitude variation or an altitude to be reached, or by the crossing of the trajectory with a radial, that is to say a half-line defined by a geographic point and a direction.

Advantageously, from the guidance setpoint holding point, the rejoining trajectory is computed in such a way that said rejoining trajectory returns to the flight plan as early as possible.

Advantageously, the guidance setpoint holding point is adjusted manually by an operator as a function of a piloting or navigation constraint.

Advantageously, when, given a piloting or navigation constraint, the trajectory length is inappropriate to observe said constraint by following the trajectory using the current guidance setpoint holding point, the first step is preceded by a preliminary step of resolution of said constraint, the guidance setpoint holding point being adjusted automatically.

Advantageously, the first step is preceded by a rejoining trajectory of a guidance setpoint.

Advantageously, the first step is preceded by a step of searching for the intersection of the current guidance setpoint trajectory with a segment of the flight plan.

Advantageously, the guidance setpoint is a heading setpoint.

Advantageously, said step of rejoining a setpoint heading comprises a set of straight or curved segments followed by the straight holding segment of the heading setpoint.

Advantageously, said step of rejoining a setpoint heading comprises at least three segments, an aircraft roll segment, a curved turn segment between the current heading followed by the aircraft and the setpoint heading and a rectilinear segment according to the setpoint heading.

Advantageously, the setpoint heading is adjusted manually by an operator or automatically as a function of a navigation distance constraint.

Advantageously, the segment of the flight plan being determined, the rejoining trajectory comprises two successive changes of heading, the first making it possible to switch from a setpoint heading to a capture heading and the second change of heading making it possible to switch from the capture heading to the heading of the segment of the flight plan.

Advantageously, once the setpoint holding point is reached along the setpoint heading, the rejoining trajectory consists in directly rejoining a designated point of the flight plan.

Advantageously, the guidance setpoint is a vertical slope setpoint or a longitudinal speed setpoint or a vertical speed setpoint.

Advantageously, the portion of the flight plan towards which the rejoining trajectory is computed is determined automatically or manually.

BRIEF DESCRIPTION OF THE DRAWINGS

The invention will be better understood and other advantages will become apparent on reading the following description given in a nonlimiting manner and using the attached figures in which.

DETAILED DESCRIPTION

Figure 1:
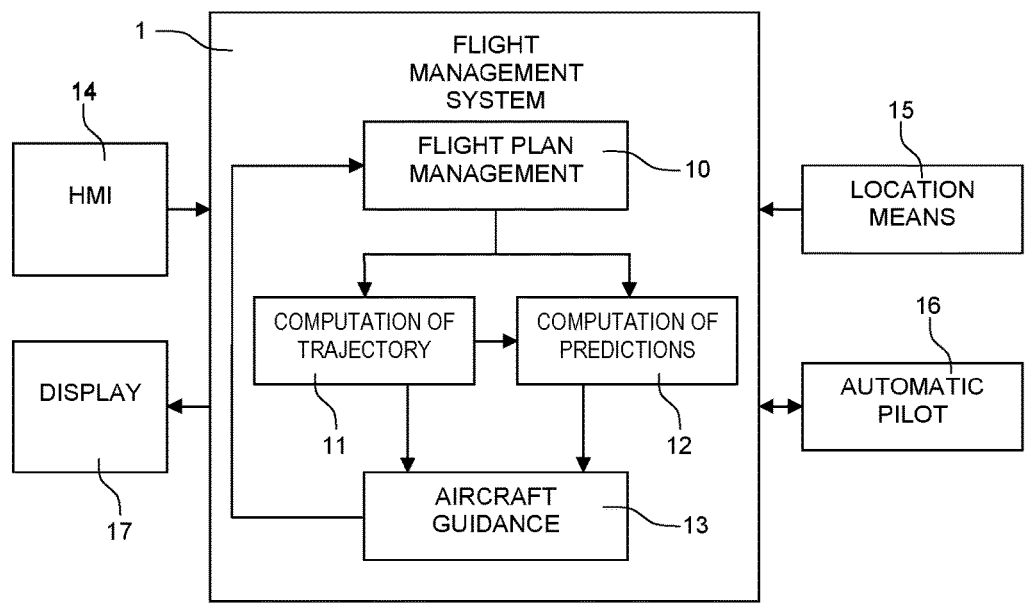
FIG. 1 represents the block diagram of a flight management system of an aircraft according to the invention.

The trajectory adjustment computation method according to the invention is implemented by the flight management system of an aircraft. As an example, FIG. 1 represents such a flight management system 1 and its interactions with the other on board systems. The flight management system is handled by one or more embedded electronic computers. Its main function is to ensure the management 10 of a determined flight plan. From information deriving from the flight plan and from a certain quantity of information deriving from the sensors of the aircraft and, in particular, from the location means 15 or from the automatic pilot 16, the management of the flight plan consists in permanently computing the trajectory 11 of the aircraft and in generating a certain number of predictions 12. A prediction should be understood to be the value of a piloting or navigation parameter concerning the present or the future of the flight. For example, a prediction concerning the future of the flight is the flight time remaining until the landing of the aircraft or the maximum flight distance given fuel reserves. The computation of the trajectory and the predictions make it possible to generate the guidance 13 of the aircraft, the guidance information being taken into account in the management of the flight plan.

Such various information deriving from the management of the flight plan is transmitted to the user, essentially by means of display devices or displays 17 which display the various piloting and navigation information.

The user can intervene on the management of the flight plan to modify it by means of different human-machine interfaces or "HMI" 14. These interfaces can be control stations of "KCCU" type, KCCU being the acronym for "Keyboard Cursor Control Unit", or of "MCDU" type, MCDU being the acronym for "Multi-Purpose Control and Display Unit". These various control stations generally comprise an alphanumeric keyboard, a system for controlling a graphic cursor and/or a display screen. It is also possible to use touch interface means positioned or not on the display screens of the instrument panel.

The user of the system is generally the pilot of the aircraft. However, the method can be implemented in the context of a ground station of an unmanned aircraft. In this case, the interactions and the display are handled in the ground station and the corresponding choices are sent to the aircraft. The guidance is then performed in the aircraft. Depending on the choices of architecture, the trajectory can be computed on the ground, and sent on board, or computed on board and downloaded to the ground for display to the operator. Likewise, certain automatic adjustments can be performed either on the ground, or on board the aircraft.

Finally, this method can be implemented in air traffic control ground stations for guiding the operator called "ATC", the acronym for "Air Traffic Control" in the choice of the instructions to be given to the aircrafts under its control, so as to optimize avoidance manoeuvres or sequencing manoeuvres in the aircraft arrival and approach procedures.

Hereinafter in the text, the terms "pilot" and "user" will be used without distinction to denote the human operator ensuring the management of the flight of the aircraft.

Figure 2:
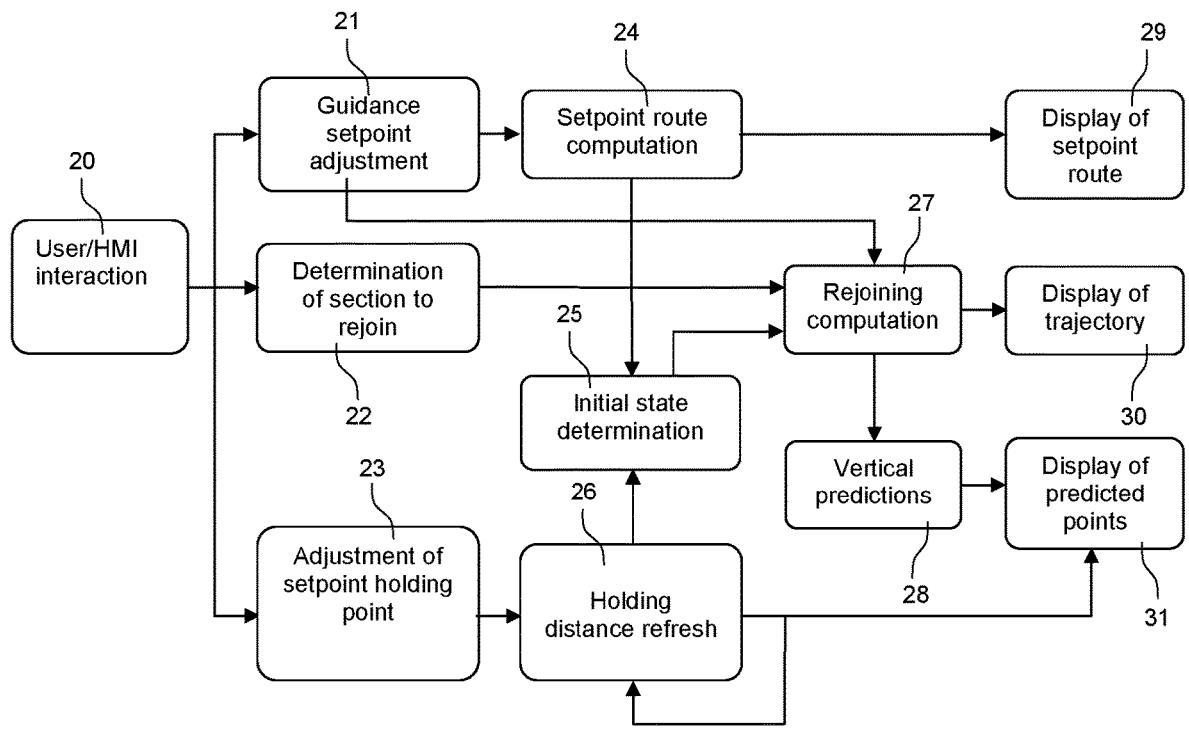
FIG. 2 represents the general block diagram of the different steps of the method according to the invention.

All of the method for adjusting a flight plan rejoining trajectory of an aircraft according to the invention is represented in FIG. 2. In this figure and in FIGS. 3 and 7, the steps of the method are represented by boxes, the arrows indicating the functional links between the different boxes. This method essentially comprises three different types of steps which are, in succession, steps of selection by the pilot or the user, computation steps and display steps.

By means of the different human-machine interfaces made available, the pilot selects, validates or modifies one of the following three parameters:
the guidance setpoint to be followed;
the section of the flight plan to be rejoined;
the guidance setpoint holding point.

These various adjustments are represented in FIG. 2 by the boxes 21, 22 and 23, the interaction being represented by the box 20.

The different computation steps are represented in the boxes 24 to 28. These steps are as follows:
computation of the setpoint route from the knowledge of the state of the aircraft and from the guidance setpoint (box 24);
refreshing of the guidance setpoint holding distance (box 26);
computation of the initial state from which the rejoining trajectory returns to the flight plan (box 25);
computation of the rejoining trajectory (box 27);
computation of the vertical predictions (box 28).

The different display steps are represented in the boxes 29 to 31. They involve displaying:
the guidance setpoint route (box 29);
the rejoining trajectory (box 30);
the predicted points (box 31).

The method according to the invention relates to the adjustment of a guidance setpoint holding point on the trajectory for rejoining a flight plan by an aircraft.

Guidance setpoint should be understood to mean the setting of a setpoint value on a flight parameter of the aircraft, whether it be the heading, a vertical slope, or a speed. As a nonlimiting example, FIGS. 4 to 8 represent the implementation of the method in the case of a heading setpoint. As a second example represented in FIG. 9, a rejoining trajectory comprising a slope setpoint is described.

Guidance setpoint holding point should be understood to be a point situated along the trajectory generated by the guidance setpoint. A guidance setpoint holding point corresponds to a geographic point defined along the guidance setpoint trajectory, either by a distance, or by a time duration, or by an altitude variation or an altitude to be reached, or by the intersection of the trajectory with a radial, that is to say a half-line defined by a geographic point and a direction.

Since the aircraft moves along the guidance setpoint trajectory, its distance to the guidance setpoint holding point decreases over time. A specific function periodically updates the current distance from the setpoint holding point, by taking into account, among other things, the current speed and the elapsed time. The period of this updating is sufficiently short to ensure a continuity of the display without detrimental effect for the pilot. Preferably, the display of the guidance setpoint trajectory is refreshed at the same rate as, or even more frequently than, the distance from the point.

When the pilot interacts on the position of the setpoint holding point, the position of the setpoint holding point at the start of interaction is stored. This stored point is called setpoint holding point history, and it is also defined by a distance along the guidance setpoint trajectory. The distance from the setpoint holding point history is updated in the same way over time, so that, in case of cancellation, the position found is placed correctly along the guidance setpoint. This updating is ongoing, including during the interactions of the pilot: the distance increments and decrements requested by the pilot are added to the current distance value periodically updated.

Finally, when the distance value becomes nil, the setpoint holding point reverts to its default distance value. In the absence of pilot interaction on the distance, the setpoint holding point is deleted. This updating can also be implemented similarly, when the setpoint holding point is specified by a delay or an altitude variation.

Figure 3:
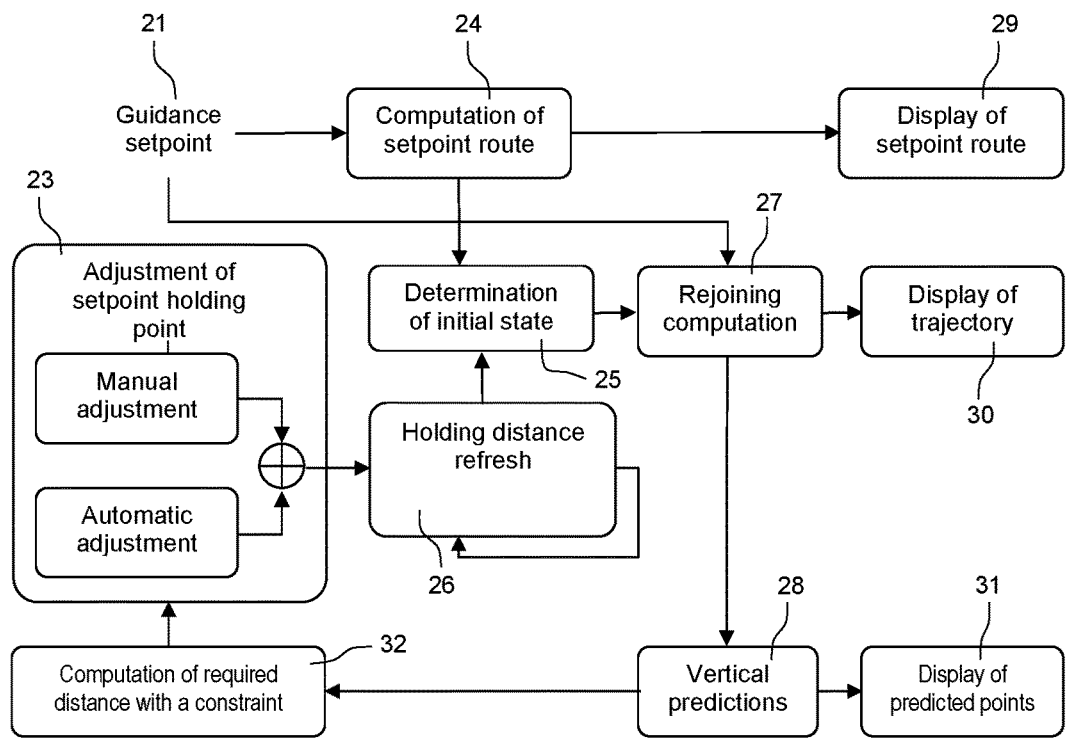
FIG. 3 represents these same steps in the case of an adjustment of the setpoint holding point.

FIG. 3 represents the method according to the invention when the rejoining trajectory comprises a guidance setpoint holding point. It comprises substantially the same boxes as the block diagram of FIG. 2 apart from an additional box 32 entitled "Computation of required distance with a constraint" detailed hereinafter in the description. The box 23 comprises two possible options for the adjustment of the setpoint holding point. In fact, this adjustment can be done manually or automatically by the flight management system.

Figure 4:
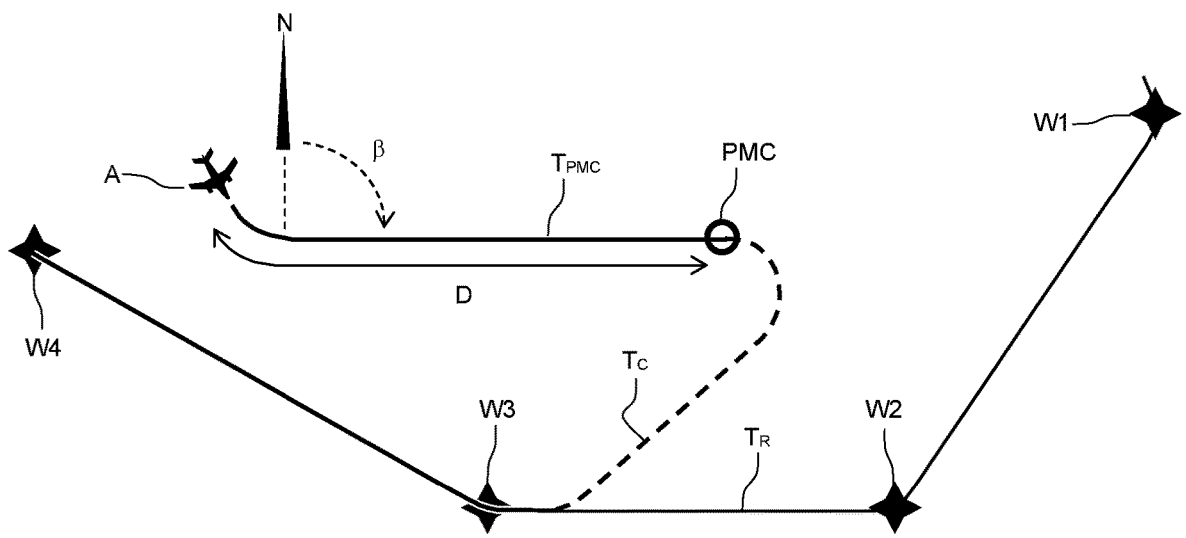
FIG. 4 represents a first rejoining trajectory in the case of an adjustment of the setpoint holding point.

FIG. 4 represents a rejoining trajectory according to the invention implementing a heading setpoint holding point PMC. At a given instant, the aircraft A is at a distance D from the heading setpoint holding point PMC. The heading setpoint is defined by the angle 3 that the direction to be followed makes with the geographic north N. The reference trajectory $T_R$ of the flight plan passes through the waypoints W1 to W4. The trajectory of the aircraft A comprises two parts. Initially, the aircraft follows the trajectory $T_{PMC}$ to the setpoint point PMC. Next, from this point, it follows the capture trajectory $T_C$ to regain the reference trajectory at a point situated, in FIG. 4, between the waypoints W2 and W3.

As has been stated, the adjustment of the setpoint holding point can be done manually. When a setpoint holding point is defined, the pilot can increase or reduce the distance defining the position of this setpoint holding point along the trajectory shown by the heading setpoint, so as to move it along the heading setpoint trajectory. Various interaction means can be envisaged for varying this distance:

- on a touch screen, the finger can be used to designate the setpoint holding point, then it can be moved by a continuous sliding movement over the screen to its new position;
- in an interactive cockpit equipped with a control station of KCCU type and with interactive display screens, the pointer can be placed on the setpoint holding point, then a rotation on the scroll wheel of the KCCU moves the setpoint holding point. The increments of this movement can be defined in proportion to the current display scale of the navigation screen;
- on an interface of MCDU type or an equivalent means equipped with keys, the interaction can be selected by a key press, then two dedicated keys allow the distance from the setpoint holding point to be incremented or decremented;
- finally, the interface can also offer the input of a distance, of a flight time or of an altitude.

Once the point is set satisfactorily, the pilot validates its position, either by a dedicated key press, or a designation on the screen. In the case of a touch screen, this final validation is optional, the end of press on the screen after the dragging movement being able to be interpreted as a validation. However, a confirmation may also be requested, to allow the modification to be cancelled.

If the new position of the point does not suit the pilot, he or she can also cancel the modification, by a key press other than validation, or a distinct designation on the screen. In this case, the position of the setpoint holding point at the start of the interaction is restored. When no setpoint holding point is defined, the default distance from the setpoint holding point is nil.

Finally, the distance modification applied by the pilot remains bounded: the resulting distance can neither become less than 0, nor exceed, for example, the maximum distance displayed on the navigation screen in the scale chosen by the pilot.

As has been stated, the adjustment of the setpoint holding point can be done automatically. In some cases, the rejoining trajectory from the current heading setpoint does not offer a satisfactory distance to a given constraint or to the destination. It may be an insufficient distance to allow the conditions of stabilization of the aircraft before landing. In this case, the margin is too small between the so-called "RDTL" distance, RDTL being the acronym for "Required Distance To Land", and the distance according to the rejoining trajectory to the runway. The distance can also be too short for the next altitude constraint to be able to be kept with a descent slope at minimum thrust.

In other cases, the pilot may have manually set an unnecessarily distant setpoint holding point, leading to an unnecessarily long trajectory length for the descent, or the required flight duration, and possibly necessitating a surplus of thrust and a pointless fuel expenditure. A shortening of trajectory can then be proposed. In these different cases, the method can automatically determine a heading deselection point adjusted according to need.

By relying on the vertical predictions, it is possible to determine a desired modification of trajectory length ΔD. This modification of length may be directly the difference between a desired margin and the current margin to ensure the stabilization or may be deduced from the current slope or ground speed, in relation to an altitude or time constraint. The adjustment of the distance from the heading setpoint holding point then depends on the type of lateral rejoining of the flight plan.

Figure 5:
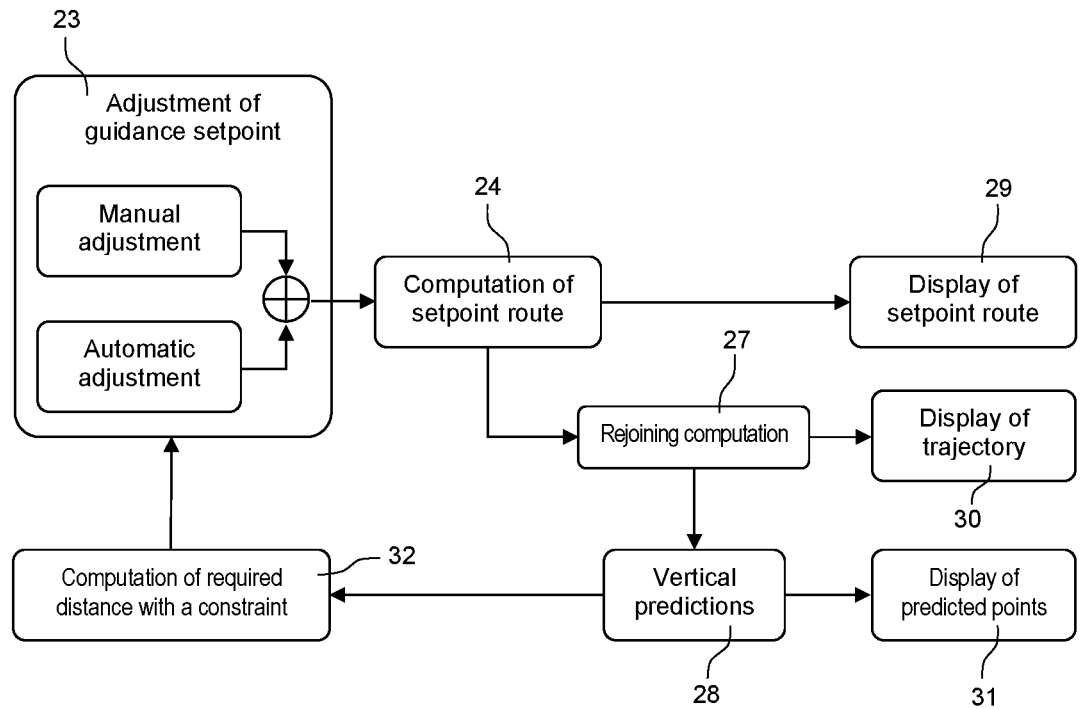
FIG. 5 represents the steps of the method in the case of an adjustment of the setpoint heading.

FIG. 5 represents the method according to the invention when the rejoining trajectory results from the adjustment of a guidance setpoint. It comprises substantially the same boxes as the block diagram of FIG. 2 apart from an additional box 32 entitled "Computation of required distance with a constraint" detailed hereinbelow in the direction. The box 23 comprises two possible options for the adjustment of the guidance setpoint. In effect, this adjustment can be done manually or automatically.

In a first variant embodiment, the rejoining trajectory is adjusted by modification of a setpoint heading. The manual adjustment corresponds to the input by the pilot of a heading value to the automatic pilot, as can be done conventionally on aircraft. This value can be input numerically, selected by rotation of a thumbwheel, designated interactively on a touchscreen or by means of a graphic pointer or even modified interactively by action on a control stick.

The modified setpoint is displayed to the pilot, either in numeric form, or by graphic indication on his or her navigation or piloting screen. The trajectory which results from the application of this setpoint is displayed on the navigation screen by the setpoint route computation and display function. In this way, the pilot immediately views the effect of the applied setpoint.

In the case of an automatic adjustment of the setpoint heading, the system can display the heading determined automatically, without modifying the selected setpoint heading. As long as no manual modification by the pilot occurs, it is possible to envisage displaying the rejoining trajectory according to the heading determined automatically or according to the selected setpoint heading, the pilot being responsible for adjusting it to the heading determined automatically. When a manual modification by the pilot is made, the heading value corresponding to the automatic adjustment can then remain indicated on the heading scale whereas the rejoining trajectory is displayed according to the heading adjusted manually by the pilot.

When the setpoint heading is not the current heading, the aircraft must then manoeuvre to rejoin the heading setpoint. In this case, the heading setpoint trajectory is typically composed of three segments: a roll segment, a curved turn segment between the current heading and the setpoint heading, then a rectilinear segment according to the setpoint heading. The turn radius, the length of the roll segment and the direction of the setpoint heading, take account of the speed of the aeroplane as well as the strength and the direction of the wind measured at the aircraft level. However, it can possibly be composed of a set of successive segments approximating the successive positions and orientations of the aircraft during the application of the setpoint, accurately taking account of the effect of the wind and the dynamics of the aircraft.

This trajectory resulting from the setpoint is then displayed to the pilot on his or her navigation screen. Along this trajectory, there are placed certain predicted points as well as the heading setpoint holding point. The trajectory resulting from the heading setpoint must be displayed, and close to the trajectory which will be effectively flown by the aircraft such that the setpoint holding point placed along this trajectory constitutes a hypothesis that is sufficiently stable to serve as initial position of the rejoining trajectory, and continue to correspond to the choice made by the pilot.

In a second variant embodiment, the pilot asks to rejoin the desired flight plan section as a priority by following the heading setpoint trajectory until an intersection is found with a segment of the flight plan section. This makes it possible, for example, to maintain the setpoint heading to the intersection of the flight plan, even if another form of rejoining, such as, for example, a rejoining according to a predetermined angle, allows a closer or shorter rejoining of the flight plan.

In this case, an intersection with the heading setpoint trajectory is sought for each segment of the flight plan section to be rejoined. If there are several intersections, according to the embodiments, the intersection that is closest along the heading setpoint trajectory, which constitutes the most natural choice, or the intersection that is earliest in the list of segments to be captured, is chosen. The latter solution is more flexible, when it is associated with the choice of the first segment to be captured.

If no intersection is found, then a warning message can be displayed to the pilot, and the rejoining trajectory is computed in the usual way.

Once the first step of computation of the rejoining trajectory has been performed according to the above hypotheses, the rejoining trajectory is continued in accordance with the existing methods. As an example, the patent FR 3 031 175 entitled "Procédé de rejointe automatique d'une route d'un aéronef" (Method for automatically rejoining a route of an aircraft) describes a procedure of this type. The hypotheses for computation of this rejoining trajectory do however require a few adjustments linked to the rejoining trajectory management method according to the invention. They are as follows:
- the setpoint heading is that defined by the pilot or can be a heading adjusted automatically to satisfy a constraint;
- instead of using the current position and orientation of the aircraft as starting position, the position and orientation defined by the position of the setpoint holding point along the heading setpoint trajectory, and the heading setpoint are used;
- instead of determining the rejoining over all of the flight plan, it is determined over the section defined by the pilot.
- if the pilot has chosen to search as a priority for an intersection along the heading setpoint trajectory, this rejoining mode is sought first, before implementing the other rejoining modalities.

When a setpoint holding point is defined, namely a non-zero setpoint holding distance, and its distance is less than the aggregate length of the roll segment and of the turn segment to acquire the setpoint heading, then the initial position of the aeroplane for the rejoining trajectory is placed at the end of the setpoint heading acquisition turn, so as to observe the heading specified by the pilot. The pilot is responsible for modifying the heading setpoint to reduce the turn if necessary. The rejoining trajectory is displayed on the navigation screen to allow the pilot to assess the impact of the chosen setpoint holding point. Similarly, the predictions are computed along this trajectory, and supplied to the pilot. The updating of these displays can be less frequent than the display of the heading setpoint and of the setpoint holding point, because they are based on the execution of the current setpoint, and therefore are relatively stable. A period of three seconds is often considered as sufficient to allow the pilot to make his or her decision in the management of the flight.

The evolution of the parameters of the aircraft along the flight can then be computed along this rejoining trajectory, then along the flight plan to the destination, according to the state of the art of predictions computed by a flight manager.

In particular, a descent profile can be computed from the destination, and by working back along the trajectory to the position of the aircraft, by taking into account the various speed, altitude or time constraints along the trajectory.

Then, the aeroplane parameters can be predicted from the aeroplane position, according to the logics of each flight phase, to the destination. When the aircraft is climbing or cruising, the computation can possibly be stopped at the predicted start-of-descent position according to the descent profile. When the aircraft is in descent phase, the predictions take into account the situation of the aircraft in relation to the descent profile, and determine the rejoining then the following of this profile to the destination.

Finally, an energy reduction computation can be computed from the aeroplane position to the energy required for the stabilization, then, depending on the final approach slope, from the stabilization height to the runway threshold. This distance, called RDTL, can be compared to the distance from the aeroplane to the runway threshold along the rejoining trajectory. The difference provides a stabilization margin which can be displayed to the pilot.

All these indications allow the pilot to ensure his or her flight is followed accurately, and in particular the descent thereof, taking into account the lateral rejoining trajectory.

In certain cases, the vertical predictions make it possible to identify that the trajectory length is insufficient to satisfy a criterion of the flight plan at a given point:
- the trajectory length is insufficient to keep to an altitude constraint, because the required sloped would exceed the capacities of the aircraft or would necessitate accelerating excessively,
- the trajectory length is insufficient to reduce the energy of the aircraft and to allow the stabilization thereof at the speed required for the approach at a minimum height above the runway threshold, the trajectory length does not make it possible to observe a time constraint at a given point, or, in an equivalent manner, does not make it possible to ensure a desired time spacing behind another aircraft at a given point, the trajectory length does not correspond to the optimal flight distance making it possible to keep to the altitude, speed and time conditions while maintaining a flight at minimum thrust.

For all these criteria, it is possible to determine a required distance to the point at which the constraint to be satisfied is located:

for an altitude constraint, it is the altitude error at the level of the constraint, divided by the slope that can be flown by the aircraft, for a stabilization constraint, it is the excess of energy at the stabilization point reduced to the weight of the aircraft, divided by the specific residual energy or "Specific Excess Power" and multiplied by the ground speed, for a time constraint, it is the time error at the constraint, multiplied by the ground speed, for an optimum distance making it possible to maintain a flight at minimum thrust, it is necessary to determine an adjustable modelled profile of altitude and of speed of the aircraft which ensures said minimum thrust.

The result of this function is a trajectory length desired to a given point. The automatic adjustment of the trajectory is possible according to the method only if the point on which the constraint bears is located after the first of the segments of the section to be rejoined, and if the rejoining occurs on a segment situated at the latest at this point. If necessary, the section to be rejoined can be restricted to stop at the latest at the point bearing the constraint. Such is in particular the case for the stabilization.

Since the predictions depend on the lateral trajectory, and particularly if the length adjustment is significant, the preceding adjustments, which constitute linear approximations, may require successive iterations. In this case, once the trajectory adjusted to the desired distance has been computed, the residual error at the point bearing the constraint is determined, and as long as this error is above a given threshold, the adjustment is iterated over a new desired trajectory length.

Figure 6:
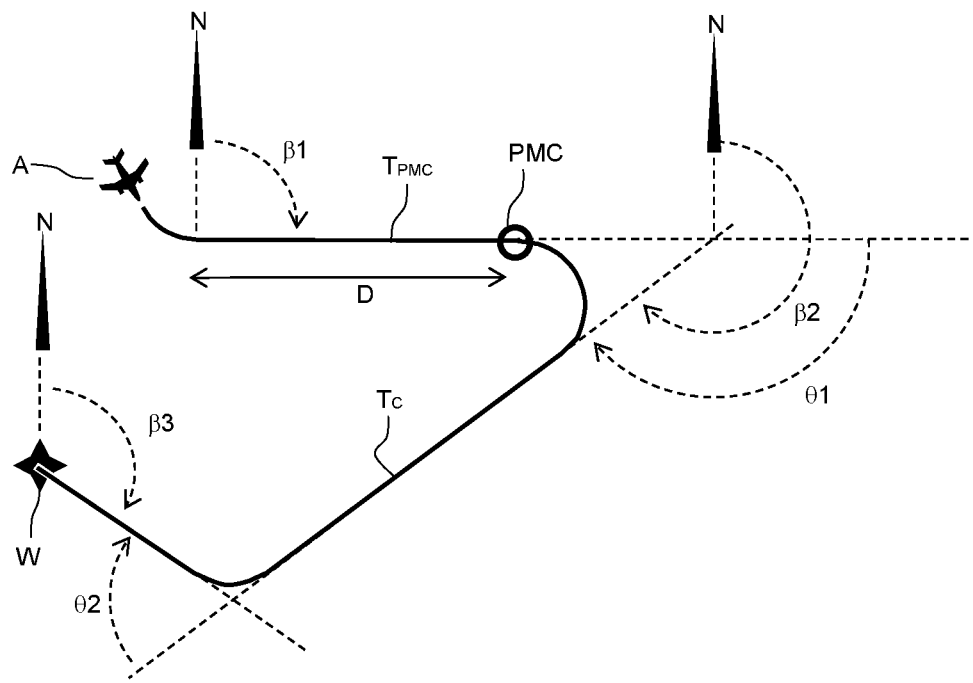
FIG. 6 represents a second rejoining trajectory in the case of an automatic adjustment of the setpoint holding point upon a capture of a segment of the flight plan with specified capture angle.

As a first example of implementation of the method according to the invention, the rejoining is done according to a capture of a segment or "leg" of the flight plan according to a specified capture angle. This rejoining is illustrated in FIG. 6. In this figure, the same references as those of FIG. 4 have been adopted. The rejoining trajectory starts from the aircraft A, passes through the point PMC to culminate at the waypoint W of the flight plan. As can be seen in this FIG. 6, the trajectory comprises three successive headings which are:

the current heading setpoint β1,
the capture heading β2,
the heading of the leg to be captured β3.

These headings therefore define two successive changes of heading:

the first change θ1 is equal to β2-β1. It begins at the heading setpoint holding point PMC;

the second change θ2 is equal to β3-β2. It allows the aircraft to regain the flight segment situated before the waypoint W.

The trajectory length variation δS resulting from a variation of setpoint heading holding distance δD can then be expressed as:

$$\frac{\partial S}{\partial D} = \left((1-\cos(\theta_1)) + \frac{\sin(\theta_1)}{\sin(\theta_2)}(1-\cos(\theta_2))\right)$$

This formula remains valid as long as the distances remain fairly great in relation to the turn radius for each heading to be able to be established before the start of the next change of heading. Furthermore, it assumes, to be applicable, that the changes of headings are sufficiently significant. In particular, if the headings β1 and β3 or β1 and β2 are identical, the distance variation will be nil. Similarly, the headings β2 and β3 are necessarily distinct because they defined the specified capture angle.

If necessary, this formula can be applied iteratively, by determining the trajectory length S corresponding to the lateral trajectory obtained, and by adjusting the setpoint heading holding distance D to reduce the difference in relation to the desired trajectory length.

Furthermore, if the heading setpoint holding length D obtained results in capturing another segment of the flight plan, then the iteration can be continued by taking into account the orientation of the new segment.

If the capture heading β2 can no longer be established, then the setpoint holding length D is bounded to allow the segment to be captured. Since the desired trajectory length cannot be obtained, the constraint which required this length cannot be kept to without implementing additional error reduction means and the pilot is informed of the failure to keep to the constraint.

Figure 7:
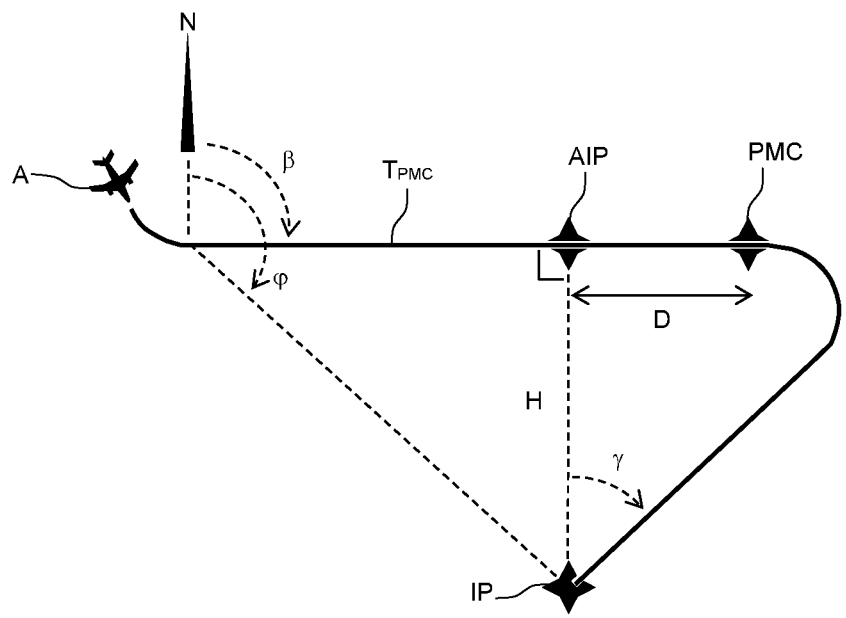
FIG. 7 represents a third rejoining trajectory in the case of an automatic adjustment of the setpoint holding point upon a rejoining at a point.

As a second example of implementation of the method according to the invention, the rejoining is a direct rejoining to a specified point. This type of rejoining is illustrated in FIG. 7. In this FIG. 7, the same references as those of FIGS. 4 and 6 have been adopted. The rejoining trajectory starts from the aircraft A, passes through the point PMC to culminate at the capture point IP of the flight plan without necessarily passing through a leg of the flight plan.

By orthogonally projecting the capture point IP onto the current heading setpoint defined by the angle β, a point AIP is defined along the setpoint heading. If the angle between the heading of arrival at the capture point IP and the axis defined by IP and AIP is defined by γ, then the trajectory length variation δS resulting from a setpoint heading holding distance variation δD can then be expressed by:

$$\frac{\partial S}{\partial D} = 1 + \eta \sin\gamma$$
$$\eta = \text{sign}(\sin(\varphi - \beta))$$

If necessary, this formula can be applied iteratively, by determining the trajectory length S corresponding to the lateral trajectory obtained, and by adjusting the setpoint heading holding distance D to reduce the difference in relation to the desired trajectory length.

Figure 8:
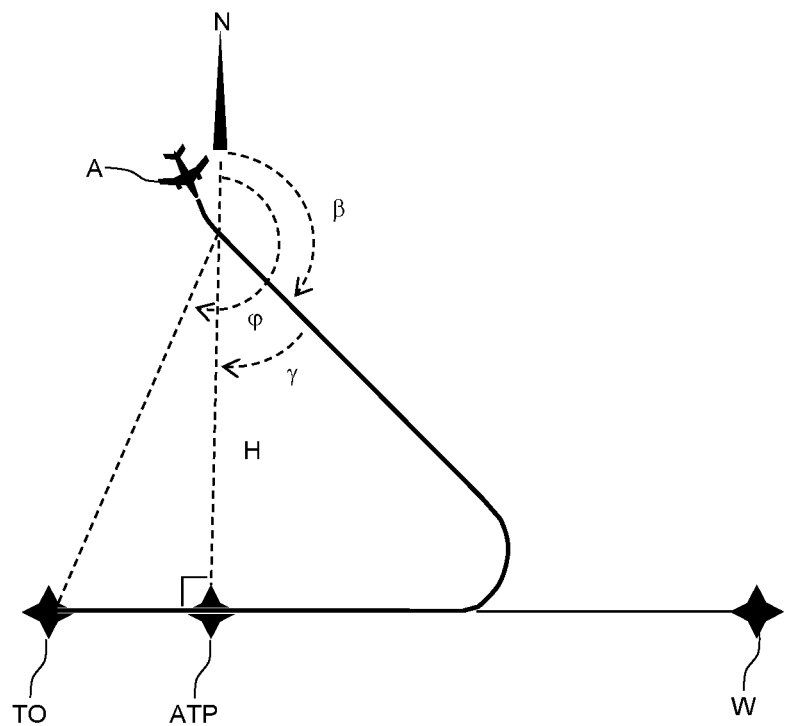
FIG. 8 represents a fourth rejoining trajectory in the case of an automatic adjustment of the heading upon a capture along the setpoint heading.

As a third example of implementation of the method according to the invention, the rejoining is a rejoining by automatic adjustment of heading. This type of rejoining is illustrated in FIG. 8. In this FIG. 8, the same references as those of FIGS. 4, 6 and 7 have been adopted. The rejoining trajectory starts from the aircraft A and rejoins the leg situated between the waypoints W and ATP to culminate at the waypoint ATP of the flight plan.

When the pilot has activated the function of priority search for an intersection of the trajectory given by the heading with the flight plan section to be rejoined, along the heading setpoint trajectory, it is possible to vary the trajectory length by adjustment of the heading. If a trajectory length is desired to satisfy a constraint or a flight criterion, then an automatic adjustment of the heading can be proposed to the pilot.

If the position of the aircraft is projected orthogonally onto the captured segment, a point ATP is defined at a distance H from the aircraft, the direction between the aircraft and the point ATP being orthogonal to the captured segment. If the setpoint heading is denoted β, the bearing from the aeroplane of the terminal point TO of the segment to be captured is denoted φ and the angle between the setpoint route and the normal to the segment to be captured at the point ATP is denoted γ, then the trajectory length variation induced by a variation of the capture angle is:

$$\frac{\partial S}{\partial \gamma} = \left(\frac{H}{\cos^2\gamma} - \frac{R}{1-\eta\sin\gamma}\right)(1+\eta\sin\gamma)$$

$$\eta = \text{sign}(\sin(\varphi - \beta))$$

If necessary, this formula can be applied iteratively, by determining the trajectory length S corresponding to the lateral trajectory obtained, and by adjusting the setpoint heading holding distance D to reduce the difference in relation to the desired trajectory length.

Furthermore, if the setpoint route β obtained results in capturing another segment of the flight plan, then the iteration can be continued by taking into account the orientation of the new segment.

Figure 9:
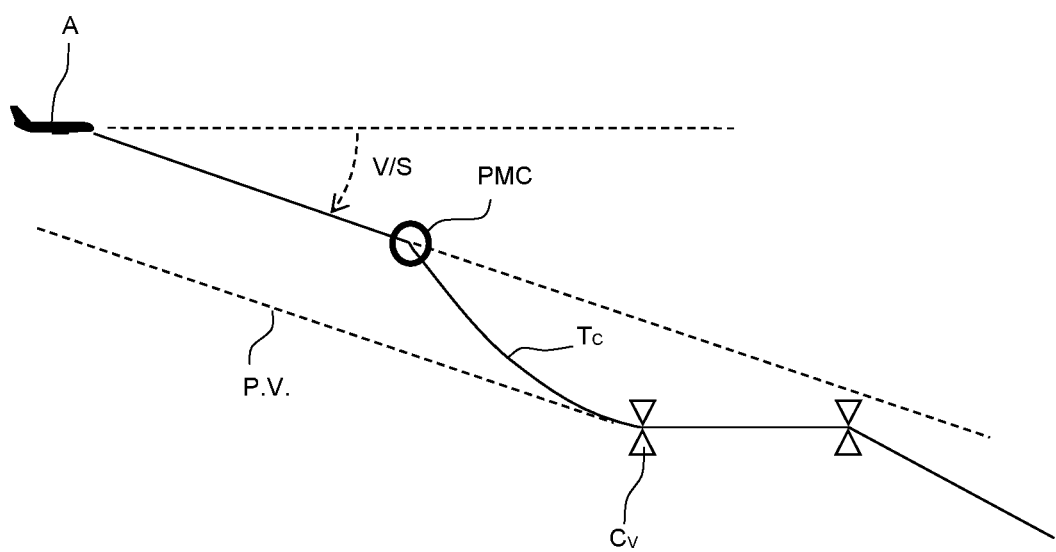
FIG. 9 represents a vertical rejoining trajectory in the case of a vertical slope setpoint holding point, adjusted to keep to an altitude constraint.

As a fourth example of implementation of the method according to the invention, the rejoining is a vertical rejoining from the holding of a vertical setpoint which can be a slope setpoint or a vertical speed setpoint. This case of application is illustrated in FIG. 9. The aircraft A has deviated from its vertical flight plan P.V., represented by dotted lines, and locks its flight onto a vertical setpoint, expressed in the figure as vertical speed V/S. A setpoint holding point PMC is positioned along the vertical setpoint, from which a rejoining trajectory is computed, for example at minimum thrust with constant speed. The pilot can himself or herself adjust the point PMC, or the latter can be adjusted automatically to allow a vertical constraint $C_V$ of the flight plan, symbolized in the figure by the two series of two opposing triangles, to be kept to.

The invention claimed is:

1. A method for adjusting a flight plan rejoining trajectory of an aircraft, said method being implemented in a flight management system of said aircraft, the method comprising:
in a first step, adjusting a rejoining trajectory such that the rejoining trajectory comprises a guidance setpoint holding point to be reached situated in an extension of a guidance setpoint, said guidance setpoint not belonging to the flight plan, said guidance setpoint holding point corresponding to a geographic point along the guidance setpoint, said geographic point being defined by a distance, by a time duration, by an altitude variation, or by an altitude to be reached,
wherein the guidance setpoint no longer being maintained when the setpoint holding point is passed; and
wherein from the guidance setpoint holding point, the rejoining trajectory is computed in such a way that said rejoining trajectory returns to a waypoint of the flight plan as early as possible.

2. The method for adjusting a flight plan rejoining trajectory according to claim 1, wherein the guidance setpoint holding point is adjusted manually by an operator as a function of a piloting or navigation constraint.

3. The method for adjusting a flight plan rejoining trajectory according to claim 1, wherein, when, given a piloting or navigation constraint, a trajectory length is inappropriate to observe said constraint by following the trajectory using a current guidance setpoint holding point, the first step is preceded by a preliminary step of resolution of said constraint, the guidance setpoint holding point being adjusted automatically.

4. The method for adjusting a flight plan rejoining trajectory according to claim 1, wherein the first step is preceded by a rejoining trajectory of a guidance setpoint.

5. The method for adjusting a flight plan rejoining trajectory according to claim 1, wherein the first step is preceded by a step of searching for the intersection of a current guidance setpoint trajectory with a segment of the flight plan.

6. The method for adjusting a flight plan rejoining trajectory according to claim 1, wherein the guidance setpoint is a heading setpoint.

7. The method for adjusting a flight plan rejoining trajectory according to claim 6, wherein said step of rejoining a setpoint heading comprises a set of straight or curved segments followed by the straight holding segment of the heading setpoint.

8. The method for adjusting a flight plan rejoining trajectory according to claim 6, wherein said step of rejoining a setpoint heading comprises at least three segments, an aircraft roll segment, a curved turn segment between the current heading followed by the aircraft and the setpoint heading and a rectilinear segment according to the setpoint heading.

9. The method for adjusting a flight plan rejoining trajectory according to claim 6, wherein the setpoint heading is adjusted manually by an operator or automatically as a function of a navigation distance constraint.

10. The method for adjusting a flight plan rejoining trajectory according to claim 6, wherein, a segment of the flight plan being determined, the rejoining trajectory comprises two successive changes of heading, the first making it possible to switch from a setpoint heading to a capture heading and a second change of heading making it possible to switch from the capture heading to the heading of the segment of the flight plan.

11. The method for adjusting a flight plan rejoining trajectory according to claim 6, wherein, once the setpoint holding point is reached along the setpoint heading, the rejoining trajectory consists in directly rejoining a designated point of the flight plan.

12. The method for adjusting a flight plan rejoining trajectory according to claim 1, wherein the guidance setpoint is a vertical slope setpoint.

13. The method for adjusting a flight plan rejoining trajectory according to claim 1, wherein the guidance setpoint is a longitudinal speed setpoint.

14. The method for adjusting a flight plan rejoining trajectory according to claim 1, wherein the guidance setpoint is a vertical speed setpoint.

15. The method for adjusting a flight plan rejoining trajectory according to claim 1, wherein a portion of the flight plan towards which the rejoining trajectory is computed is determined automatically or manually.

* * * * *